United States Patent
Shirlee et al.

[11] Patent Number: 6,095,587
[45] Date of Patent: Aug. 1, 2000

[54] PICKUP TRUCK BED COVER

[76] Inventors: Harold Shirlee; John Sargent; Walter Davis, III, all of 3401 Missouri St., Pine Bluff, Ark. 71601

[21] Appl. No.: 09/190,933

[22] Filed: Nov. 12, 1998

[51] Int. Cl.[7] ...................................................... B60P 7/02
[52] U.S. Cl. ............................... 296/100.07; 296/100.06; 296/57.1; 296/61
[58] Field of Search ...................... 296/57.1, 61, 100.06, 296/100.07, 100.1; 16/277, 304

[56] References Cited

U.S. PATENT DOCUMENTS

| | | | |
|---|---|---|---|
| 2,979,361 | 4/1961 | Eppinger et al. | 296/100.06 |
| 3,642,156 | 2/1972 | Stenson | 296/61 X |
| 3,713,553 | 1/1973 | Curtis et al. | 296/61 X |
| 3,858,744 | 1/1975 | Garvert | 296/100.07 X |
| 4,585,267 | 4/1986 | Friesen | 296/100.1 |
| 4,627,658 | 12/1986 | Vold et al. | 296/100.1 |
| 4,943,108 | 7/1990 | Turnbull | 296/100.07 |
| 5,312,148 | 5/1994 | Morgan | 296/61 |
| 5,312,149 | 5/1994 | Boone | 296/61 |
| 5,540,474 | 7/1996 | Holland | 296/61 |
| 5,907,276 | 5/1999 | Lance | 296/61 X |

*Primary Examiner*—D. Glenn Dayoan
*Assistant Examiner*—Jason Morrow
*Attorney, Agent, or Firm*—George L. Williamson

[57] ABSTRACT

A tonneau cover assembly for selectively covering a pickup truck bed. The truck bed has a left sidewall, a right sidewall, a floor and a tailgate. The tonneau cover assembly comprises a left cover and a right cover, a plurality of hinges attaching the covers to the sidewalls, a pair of rods attached to the inside of the sidewalls, and a pair of springs coiled on the rods. The springs have end portions that extend over the inside of the sidewalls, and a center portion that extends over the sidewalls. The tonneau cover assembly further has a locking mechanism to securely lock the covers flat against the top of the truck bed.

8 Claims, 3 Drawing Sheets

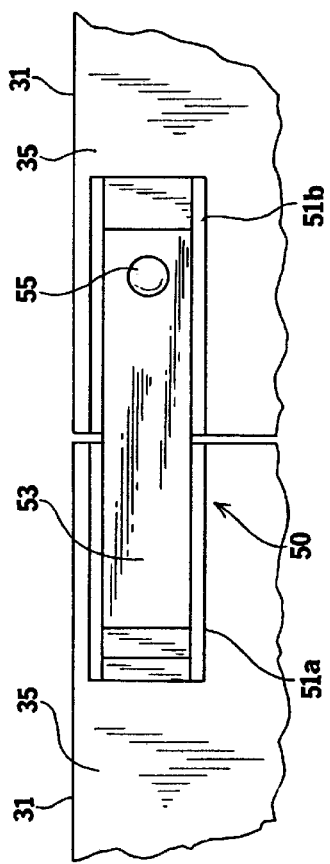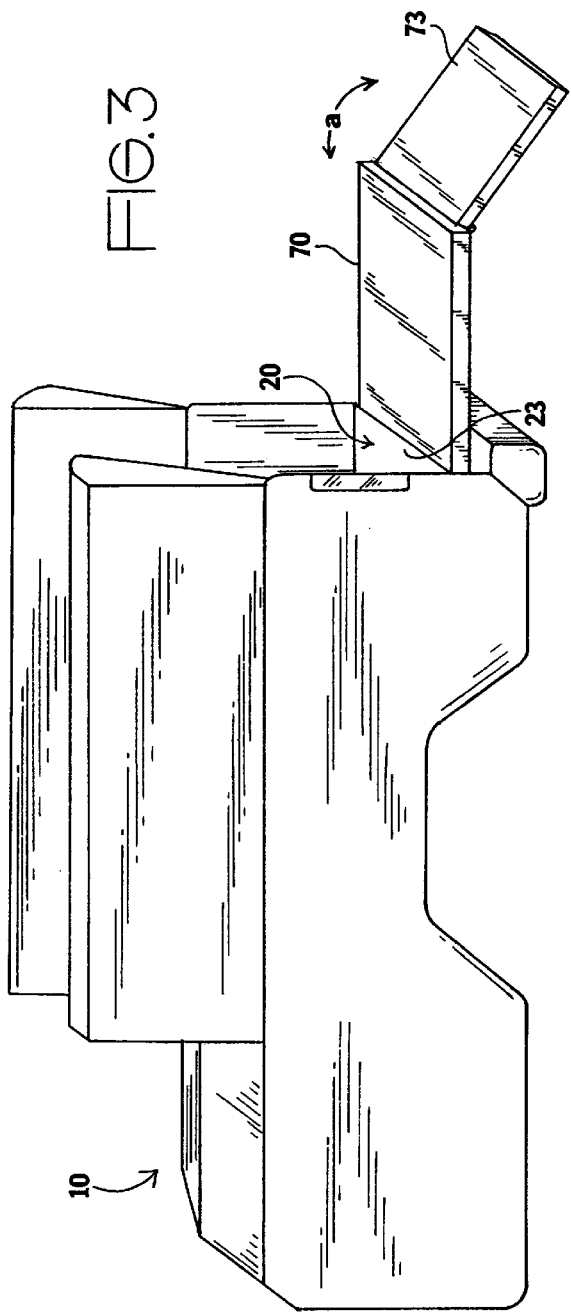

PICKUP TRUCK BED COVER

BACKGROUND OF THE INVENTION

The invention relates to a truck bed cover. More particularly, the invention relates to a tonneau cover assembly having a pair of covers that are hingeably attached to the sidewalls of the pickup truck.

Pickup trucks having a cab and an open bed are popular for their sporty appearance and their usefulness in transporting cargo for both sport and work-related purposes. Because cargo may be transported and stored during all types of weather, pickup trucks frequently utilize covers to protect the cargo stored on the truck bed.

Two types of covers are generally available for truck beds: caps and tonneau covers. A cap is usually shaped similar to the truck bed and provides a large enclosed area in the bed of the truck. U.S. Pat. No. 5,102,185 to Lake discloses such a cover, having a lift-roof cover of full cab height.

In contrast, a tonneau cover is generally a flat sheet that lies flat against the top of the bed. A tonneau cover gives the pickup truck a sleeker appearance. Tonneau covers generally comprise two or more movable rigid cover panels with a framed or molded shape to provide a load bearing surface on top of the truck bed.

Different versions of tonneau covers have been proposed. For example, U.S. Pat. No. 5,632,522 to Gaitan et al. discloses a hinge assembly for removably mounting a cover to a truck bed, and comprises a mounting assembly and a hinge element. U.S. Pat. No. 5,183,309 to Jordan discloses a cover assembly for the truck bed consisting of three rectangular panels arranged longitudinally along the top of the compartment. U.S. Pat. No. 4,284,303 to Hather discloses a pair of elongated cover sections in a side-by-side relation and having remote marginal edges thereof spaced apart.

Unfortunately, most of the known tonneau covers are pivoted along the longitudinal center of the truck bed. Since bulky objects may require the entirety of the truck bed for storage, mounting the tonneau covers from the longitudinal center prevents storage of bulky objects thereunder.

Thus, there is a need for a tonneau cover assembly that pivots from the sides of the truck bed and allows usage of the entire truck bed for storing and transporting bulky cargo. It should be noted that while the existing tonneau covers may be suitable for general usage, they are not as suitable as the present invention disclosed hereinafter.

SUMMARY OF THE INVENTION

It is an object of the invention to provide a tonneau cover assembly.

It is another object of the invention to provide a tonneau cover assembly comprising a pair of covers that pivot from the sidewalls of a truck bed.

It is a further object of the present invention to provide a tonneau cover assembly that can remain securely in the open position when storing oversized cargo on the truck bed. Accordingly, the present invention discloses a tonneau cover assembly having a pair of covers hinged to the left and right sides of the truck bed. The covers are held upright by a pair of springs mounted on the sidewalls of the truck bed. The tonneau cover assembly has a locking mechanism capable of holding the covers flat against the top of the truck bed.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

The above and other aspects, features and advantages of the present invention will be more apparent from the following detailed description thereof, which is presented in conjunction with the following drawings, wherein corresponding reference characters indicate corresponding components throughout the drawing figures.

FIG. 3 is a diagrammatic perspective view showing an extension plate pivoting from the tailgate.

FIG. 4 is a top plan view of the locking mechanism to secure the covers flat against the top of the truck bed.

DETAILED DESCRIPTION OF THE PREFERRED EMBODIMENTS

Figure 1:
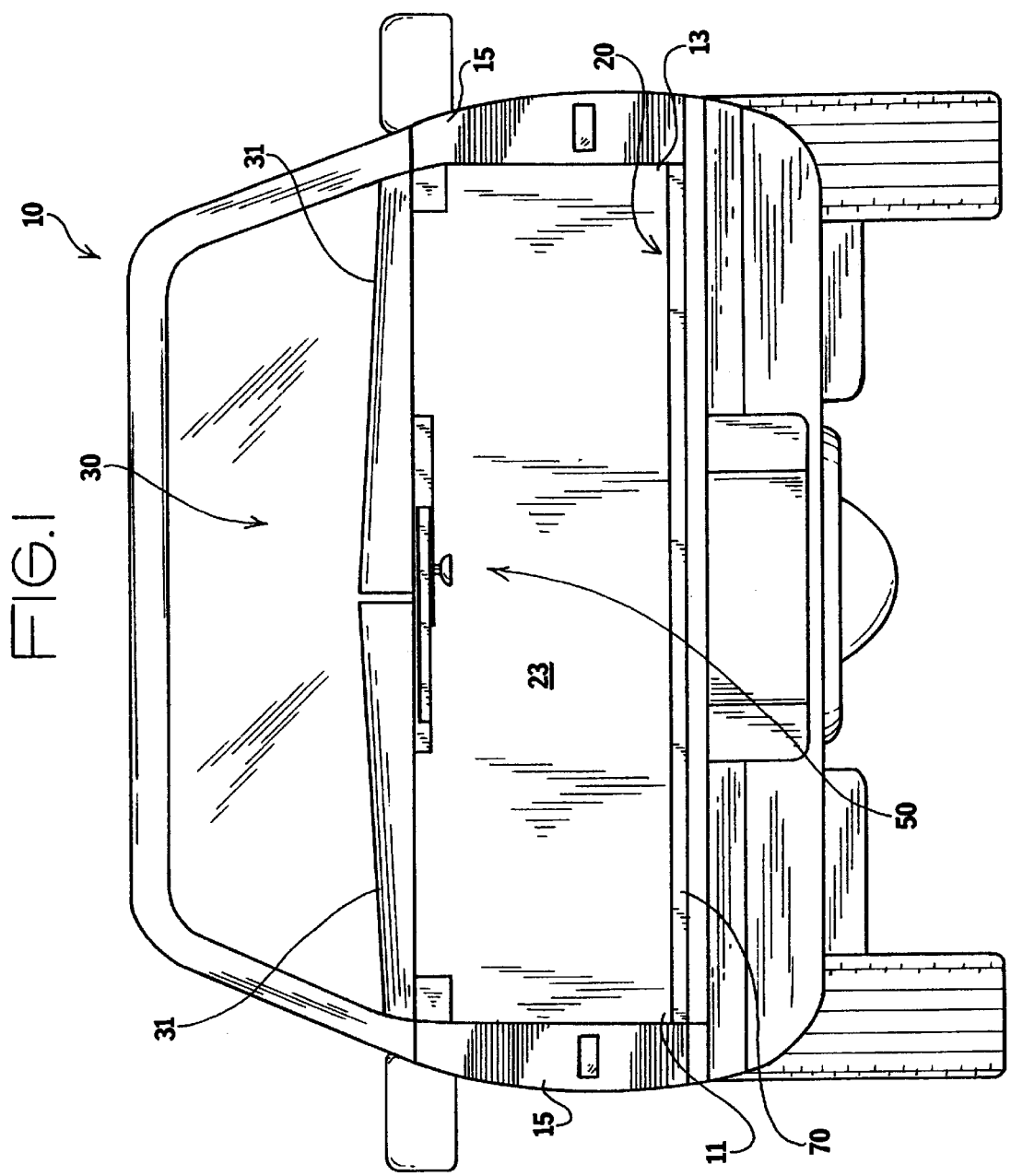
FIG. 1 is a rear elevational view of a pickup truck having a tonneau cover assembly.

FIG. 1 illustrates a pickup truck 10 with a tonneau cover assembly 30. The truck 10 has a cab and a truck bed 20. The truck bed 20 comprises a pair of sidewalls 15 on its left side 11 and right side 13, a tailgate 70, and a floor 23 therebetween. The floor 23 is used for storing cargo thereon.

The tonneau cover assembly 30 comprises a pair of covers 31 that are affixed on top of the sidewalls 15. The truck bed 20 may be accessed by pulling the covers 31 into a vertical position. According to the invention, the covers 31 may be constructed from a variety of different materials, such as plywood, plastic, an aluminum alloy or the like. It is envisioned that the design and color of the covers will conform to the color and design of the entire truck 10.

Figure 2:
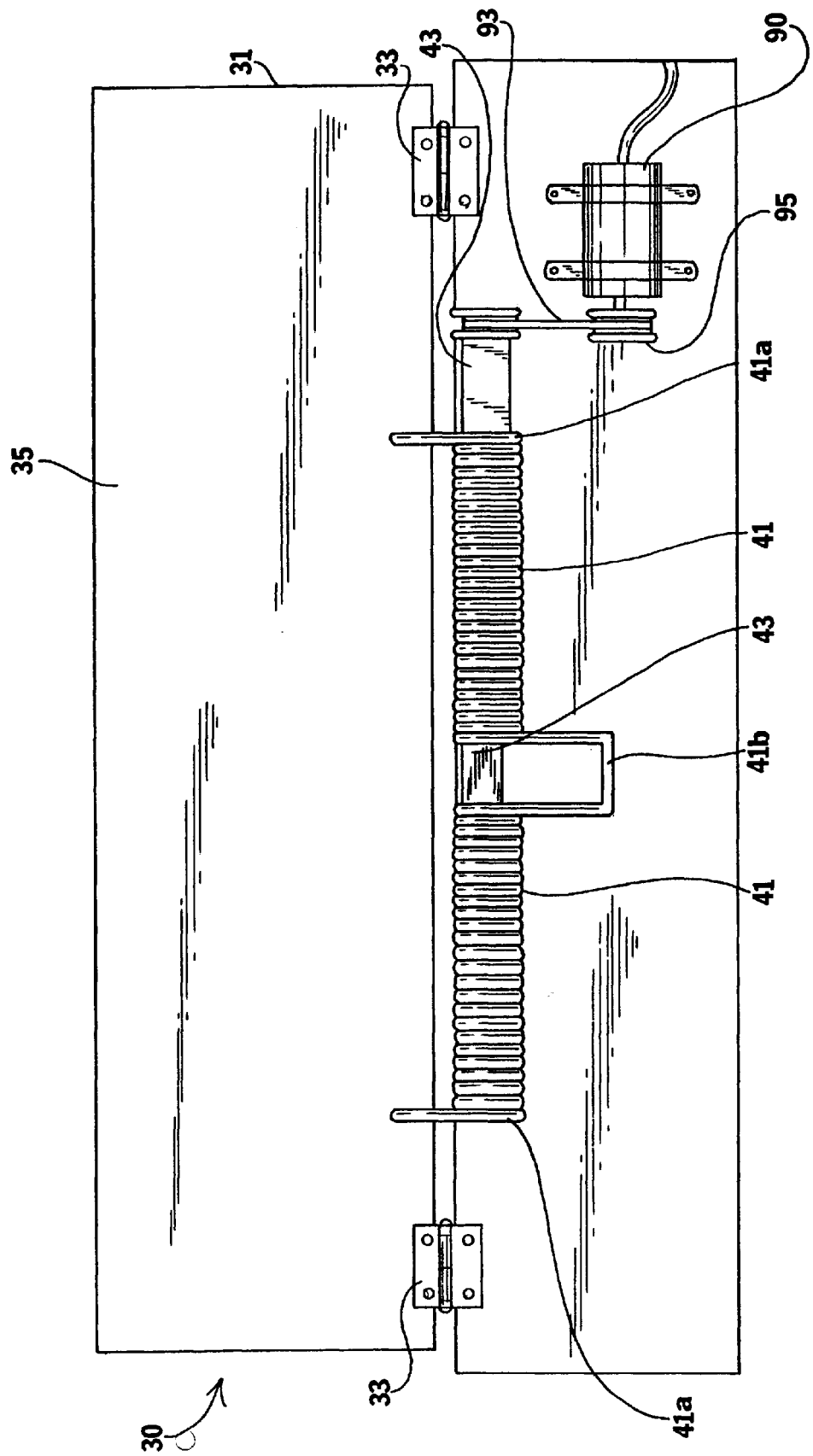
FIG. 2 provides a side view of a cover member attached to the side of the truck bed in accordance with the present invention.

FIG. 2 shows the cover 31 extending vertically upward from the sidewall 15. The cover 31 has an inner surface 35. A plurality of hinges 33 attach the cover 31 on top of the inner surface 35 of the sidewall 15, such that the cover 31 pivots upward to allow access to the floor 23 of the truck bed 20.

A pair of rods 43 are securely mounted onto the sidewalls 15, below the hinges 33. The rods 43 are tightly coiled with a spring 41 having end segments 41a that lie against the inner surface 35 of the covers 31, which causes the end segments 41a to extend in the direction of the covers 31. The spring 41 has a central portion 41b that lies flat against each sidewall 15.

The spring 41 is tensioned such that the end segments 41a are upright in their free state. Consequently, when the cover 31 is pivoted vertically upward, the end segments 41a securely hold it in place, as shown in FIG. 2. The tension of the spring 41 chosen ensures that the cover 31 does not pivot upward when it is lying flat against the top of the truck bed 20.

According to one embodiment, a motor 90 is provided for remote operation of the tonneau cover assembly 30. The motor 90 has a flexible band 93 that is mounted on a rotary drum 95 protruding from the motor 90. The band 93 connects to the rod 43 with the spring 41 tightly coiled thereon. The motor 90 allows one to raise or lower the covers 31 from within the cab of the truck 10.

When the motor 90 is activated, the rotary drum 95 spins and rotates the mounted band 93, which results in rotation of the spring 41 tightly coiled atop the rod 43. As discussed above, rotation of the spring 41 results in the opening and closing of the covers 31.

As shown in FIG. 1, the tonneau cover assembly 30 has a locking mechanism 50 that secures the two covers 31 on top of the truck bed 20. FIG. 4 provides a more detailed illustration of the locking mechanism 50. The locking mechanism 50 comprises a left housing 51*a* and a right housing 51*b*, which are affixed on the inner surface 35 of the covers 31. The left housing 51*a* secures a slide 53, wherein its front section may be slid into the right housing 51*b* for securing the pair of covers 31 on top of the truck bed 20. The slide 53 has a handle 55 for facilitating the sliding of the slide 53 into the right housing 51*b*.

As shown in FIG. 3, the tailgate 70 extends rearward from the floor 23 of the truck bed 20. The tailgate 70 has an extension plate 73 pivoting rearward therefrom, in the direction of arrow A. The extension plate 73 allows storage of over-sized objects which project beyond the trunk bed 23.

Many specific details contained in the above description merely illustrate some preferred embodiments and should not be construed as a limitation on the scope of the invention. Accordingly, many other variations are possible within the spirit of the present invention, limited only by the scope of the appended claims.

We claim:

1. A tonneau cover assembly for a pickup truck bed having a left sidewall, a right sidewall, a floor and a tailgate extending from the rear thereof, the tonneau cover assembly comprising:

a left cover and a right cover, the left cover and the right cover having an inner surface;

a plurality of hinges, wherein said hinges pivotably attach the left cover to the left sidewall and the right cover to the right sidewall;

a pair of rods fixedly attached on the inner surface of the left sidewall and the right sidewall; and a pair of springs coiled on the pair of rods, wherein said springs each have a pair of end portions which extend on the inner surface of the left cover and the right cover, and a center portion that extends over the left sidewall and the right sidewall of the truck bed.

2. The tonneau cover assembly of claim 1, further comprising a locking mechanism to securely lock the left cover and the right cover flat against the top of the truck bed.

3. The tonneau cover assembly of claim 2, wherein the locking mechanism comprises:

a pair of housings mounted on the left cover and the right cover; and a slide secured within one of said pair of housings, wherein a front portion of the slide may be pulled into the second of said pair of housings to secure the left cover and the right cover on the top of the truck bed.

4. The tonneau cover assembly of claim 3, wherein the front portion of the slide has a handle for facilitating pulling of slide.

5. The tonneau cover assembly of claim 1, wherein the spring is tightly coiled atop the rod, such that rotation of the rod causes the spring to rotate.

6. The tonneau cover assembly of claim 5, further comprising a pair of motors connected to said pair of rods, wherein each of said motors may be activated to selectively open and close the left cover and the right cover.

7. The tonneau cover assembly of claim 6, wherein said motors have a rotary drum protruding therefrom, each of said rotary drums mounting a band thereon, said band connected to the rod, wherein rotation by the rotary drum causes the spring coiled atop the rod to rotate for selectively opening and closing the left cover and the right cover.

8. The tonneau cover assembly of claim 1, wherein the tailgate has an extension plate pivoted rearward therefrom for allowing storage of over-sized cargo projecting from the rear of the truck bed.

* * * * *